(12) United States Patent
Larson et al.

(10) Patent No.: US 10,473,554 B2
(45) Date of Patent: Nov. 12, 2019

(54) GEARBOX TORQUE MEASUREMENT SYSTEM

(71) Applicant: Moog Inc., East Aurora, NY (US)

(72) Inventors: Lowell Van Lund Larson, Huntington Beach, CA (US); Jeremy Jason Deake, Long Beach, CA (US)

(73) Assignee: Moog Inc., East Aurora, NY (US)

( * ) Notice: Subject to any disclaimer, the term of this patent is extended or adjusted under 35 U.S.C. 154(b) by 161 days.

(21) Appl. No.: 15/013,234

(22) Filed: Feb. 2, 2016

(65) Prior Publication Data
US 2017/0219445 A1 Aug. 3, 2017

(51) Int. Cl.
*G01L 3/10* (2006.01)
*G01M 13/021* (2019.01)
*G01L 3/04* (2006.01)
*G01L 3/14* (2006.01)

(52) U.S. Cl.
CPC ............ *G01M 13/021* (2013.01); *G01L 3/04* (2013.01); *G01L 3/1478* (2013.01)

(58) Field of Classification Search
CPC .... G01L 3/10; G01L 1/04; G01L 1/14; G01M 13/021; F16H 59/16
See application file for complete search history.

(56) References Cited

U.S. PATENT DOCUMENTS 4,660,439 A * 4/1987 Hiraiwa .................. F16H 3/66
475/276
4,898,026 A * 2/1990 Damitz ............... G01M 13/026
73/115.01
4,947,330 A * 8/1990 Hiramatsu ............ F16H 59/141
477/121
(Continued)

FOREIGN PATENT DOCUMENTS

EP 0231665 A1 8/1987
GB 2547182 A * 8/2017
(Continued)

OTHER PUBLICATIONS

Winczner, K., The Basics of Torque Measurement using sensors, instrumentation and telemetry, http://www.sensorland.com/HowPage075.html, downloaded Jan. 13, 2019.

*Primary Examiner* — Harshad R Patel
*Assistant Examiner* — Tran M. Tran
(74) *Attorney, Agent, or Firm* — Hodgson Russ LLP

(57) ABSTRACT

A torque transmission apparatus incorporates a differential gear system and a stationary sensor connected to the differential gear system for measuring output torque. The stationary sensor may be connected to a measurement output element of the differential gear system by a torsionally compliant measurement member, wherein the stationary sensor measures torsional deformation of the measurement member. The torsional deformation may be measured directly, or it may be measured following amplification by a gear train. A rotary position sensor may be used as the stationary sensor. Alternatively, the stationary sensor may be connected to the measurement output element of the differential gear system by way of a rigid measurement member, wherein the stationary sensor measures force applied by the measurement member. In this alternative, a force sensor may be used as the stationary sensor.

22 Claims, 3 Drawing Sheets

(56) References Cited

U.S. PATENT DOCUMENTS

| | | | | |
|---|---|---|---|---|
| 4,979,599 A * | 12/1990 | Nishida | ............... | B60W 10/02 192/109 F |
| 5,327,790 A | 7/1994 | Levin et al. | | |
| 5,613,920 A * | 3/1997 | Uno | ............... | B60W 10/06 477/109 |
| 5,726,353 A * | 3/1998 | Matsuda | ............... | F16H 59/16 180/338 |
| 5,776,031 A * | 7/1998 | Minowa | ............... | B60K 28/165 477/143 |
| 5,951,424 A | 9/1999 | Briceland | | |
| 5,979,404 A * | 11/1999 | Minowa | ............... | B60W 30/18 123/399 |
| 6,077,191 A * | 6/2000 | Minowa | ............... | B60W 10/06 477/107 |
| 6,175,793 B1 * | 1/2001 | Ironside | ............... | B62D 5/0481 180/170 |
| 6,461,265 B1 * | 10/2002 | Graham | ............... | F16H 3/724 475/5 |
| 6,638,193 B2 * | 10/2003 | Hamai | ............... | B60K 6/387 475/151 |
| 6,662,671 B1 * | 12/2003 | Kopp | ............... | G01M 13/025 73/862.08 |
| 6,722,485 B1 * | 4/2004 | Gitnes | ............... | B64C 13/28 188/82.2 |
| 6,729,178 B2 | 5/2004 | Leska et al. | | |
| 6,820,472 B2 * | 11/2004 | Ranchin | ............... | G01M 13/025 73/115.02 |
| 7,235,033 B2 * | 6/2007 | Eriksson | ............... | F16H 59/16 477/107 |
| 7,360,458 B2 * | 4/2008 | Heinzelmann | ............... | F16H 59/16 701/61 |
| 7,478,572 B2 * | 1/2009 | Maten | ............... | F16H 61/688 74/331 |
| 7,536,856 B2 * | 5/2009 | Du | ............... | F16H 61/433 60/445 |
| 7,563,201 B2 * | 7/2009 | Martin | ............... | F16H 59/16 477/169 |
| 7,568,274 B2 * | 8/2009 | Yoneda | ............... | G01L 3/102 29/458 |
| 7,704,177 B2 * | 4/2010 | Vornehm | ............... | B60K 6/48 475/5 |
| 7,945,397 B2 * | 5/2011 | Kar | ............... | G01M 13/021 702/34 |
| 8,011,256 B2 * | 9/2011 | Yoneda | ............... | G01L 3/102 29/595 |
| 8,356,513 B2 * | 1/2013 | Wakamatsu | ............... | G01M 13/022 73/115.02 |
| 8,417,411 B2 * | 4/2013 | Dlugoss | ............... | F16H 59/16 475/123 |
| 8,573,084 B2 * | 11/2013 | Ross | ............... | F16H 3/006 74/330 |
| 8,775,044 B2 * | 7/2014 | Teslak | ............... | F16H 59/16 701/67 |
| 8,798,889 B2 * | 8/2014 | Fujii | ............... | F16H 59/16 280/734 |
| 8,905,895 B2 * | 12/2014 | Scalf | ............... | H02K 11/24 475/343 |
| 9,146,167 B2 * | 9/2015 | Kapas | ............... | G01L 3/102 |
| 9,327,719 B2 * | 5/2016 | Pettersson | ............... | B60K 6/365 |
| 9,470,272 B2 * | 10/2016 | Gitnes | ............... | F16D 7/00 |
| 9,605,757 B2 * | 3/2017 | Mancarella | ............... | B60W 10/30 |
| 9,651,140 B2 * | 5/2017 | Åsbogard | ............... | F16H 61/688 |
| 9,670,999 B2 * | 6/2017 | Gitnes | ............... | F16H 25/2015 |
| 2003/0218458 A1 | 11/2003 | Seger et al. | | |
| 2005/0022614 A1 | 2/2005 | Naruse et al. | | |
| 2007/0068287 A1 | 3/2007 | Stehlin et al. | | |
| 2010/0276942 A1 * | 11/2010 | Hicks | ............... | F16H 3/724 290/1 C |
| 2013/0199464 A1 * | 8/2013 | Burr | ............... | B60K 6/48 123/2 |
| 2014/0230570 A1 | 8/2014 | Kapas et al. | | |
| 2017/0165834 A1 * | 6/2017 | Hares | ............... | B25J 9/1641 |

FOREIGN PATENT DOCUMENTS

| | | |
|---|---|---|
| JP | S4951994 A | 5/1974 |
| JP | S5531982 A | 3/1980 |
| JP | S5564739 U | 5/1980 |
| JP | S6275221 A | 4/1987 |
| JP | S641123 U | 1/1989 |
| JP | H0545239 A | 2/1993 |
| JP | H07149165 A | 6/1995 |
| JP | 2014016222 A | 1/2014 |

* cited by examiner

GEARBOX TORQUE MEASUREMENT SYSTEM

FIELD OF THE INVENTION

The present invention relates generally to systems for measuring an output torque of a gearbox.

BACKGROUND OF THE INVENTION

In torque transmission systems, it is desired to monitor the output torque transmitted by the system, such as a gearbox, in order to prevent damage associated with a torque overload and/or provide feedback for control systems. Continuous torque monitoring of output torque is useful in various types of actuators, including actuators used for aircraft flight control systems and other applications.

One known approach for monitoring output torque is to measure strain on a rotating shaft using a torque sensor that rotates with the shaft. The measurement information generated by the rotating torque sensor must be transmitted via a slip ring or an electromagnetic field to a stationary receiver. Consequently, this approach is complex, costly, and unreliable.

Another known approach is to determine output torque by analyzing a pressure difference of a hydraulic drive motor or an energizing current of an electric drive motor, and then calculating the actual output torque by taking into account the gear efficiency and drag of the system. If the gear efficiency and drag of the system are not accurately known, or if they change due to variation in the operating conditions, accuracy of the calculated output torque will suffer.

A third known approach is to measure force at a mounting point of a component using strain gauges. This method is usually difficult to implement. Another drawback is that measurement signals generated by traditional strain gauge load sensing devices have large amounts of temperature error at warm and cold temperature extremes. Such temperature extremes are common, for example, in aircraft applications.

What is needed is a torque measurement system for a gearbox that is simple and economical to implement, and is highly accurate even when experiencing warm and cold temperature extremes.

SUMMARY OF THE INVENTION

The present invention meets the stated need by configuring a gearbox system such that a stationary (i.e. non-rotating) sensor measures an output torque of the system. A torque transmission apparatus of the invention incorporates a differential gear system including an input element, a transmission output element, and a measurement output element, wherein the transmission output element rotates in response to rotation of the input element, while the measurement output element statically reacts torque. A motor-driven input shaft is arranged to drive rotation of the input element, and an output shaft is driven to rotate by rotation of the transmission output element to transmit an output torque. A measurement member is connected to the measurement output element of the differential gear system, and a stationary sensor is arranged to detect a deformation of the measurement member or a force applied by the measurement member due to rotation of the measurement output element, wherein the deformation or the force is proportional to the output torque. The stationary sensor generates a signal representative of the output torque.

In a first embodiment of the invention, the measurement member is a torsionally compliant member having one end fixed to the measurement output element of the differential gear system and another end fixed to structural ground. The compliant measurement member undergoes torsional deformation caused by rotation of the measurement output element, and the stationary sensor is arranged to directly detect torsional deflection (i.e. twisting deformation) of the measurement member of the measurement member.

In a second embodiment of the invention similar to the first embodiment, the torsional deflection experienced by the measurement member is indirectly measured by the stationary sensor after the torsional deflection is amplified by a gear train. A rotary position sensor may be used as the stationary sensor to measure the amplified torsional deflection.

A third embodiment of the invention is similar to the second embodiment, however the gear train is preloaded in a balanced spring arrangement to remove backlash from the gear train.

Variations applicable to all embodiments include the use of a planetary differential gear train; the use of two or more separate input drives while still measuring a single output torque; and use of a force sensor as the stationary sensor, wherein the force sensor is linked to the measurement output gear, for example by configuring the measurement member as a bell crank.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

Figure 1:
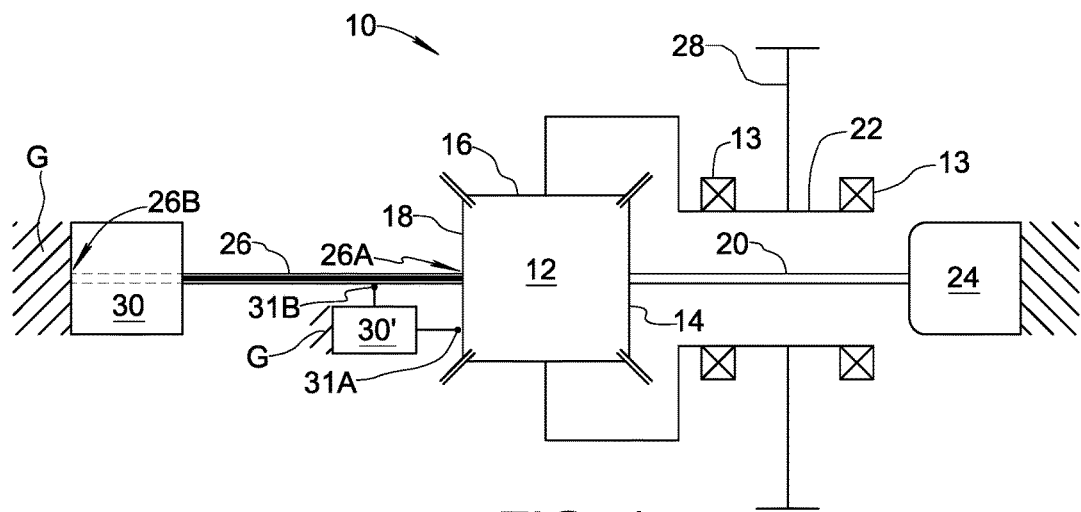
FIG. 1 is a schematic diagram of a torque transmission apparatus incorporating a torque measurement system in accordance with a first embodiment of the present invention.

FIG. 1 is a schematic representation of a torque transmission apparatus 10 incorporating a torque measurement system in accordance with a first embodiment of the present invention. Torque transmission apparatus 10 comprises a differential gear system 12 including an input element 14, a transmission output element 16, and a measurement output element 18, wherein transmission output element 16 rotates in response to rotation of input element 14, and measurement output element 18 is arranged to react torque. Apparatus 10 also comprises a rotatable input shaft 20 arranged to drive rotation of input element 14, and a rotatable output shaft 22 driven to rotate by rotation of transmission output element 16. As may be understood, input shaft 20 may be driven by an input motor 24, for example an electric or hydraulic motor, and output shaft 22 transmits an output torque to downstream components (not shown), for example through an output gear 28 arranged to rotate with output shaft 22. Reference numeral 13 denotes a rotary bearing.

In accordance with the present invention, torque transmission apparatus 10 incorporates a torque measurement system for measuring output torque. More specifically, apparatus 10 comprises a measurement member 26 connected to measurement output element 18 of differential gear system 12, and at least one stationary sensor 30, 30' for measuring output torque. Stationary sensor 30 in FIG. 1 detects either a deformation of measurement member 26 or a force applied by measurement member 26 due to torque reaction of measurement output element 18. As will be understood, such deformation or applied force is proportional to the output torque. Stationary sensor 30' in FIG. 1 may detect angular displacement of measurement output element 18 or a force applied by measurement output element 18 due to torque reaction, which is also proportional to the output torque; this option is indicated schematically at location 31A. Alternatively, stationary sensor 30' in FIG. 1 may detect a deformation of measurement member 26 or a force applied by measurement member 26; this option is represented schematically at location 31B. Each stationary sensor 30, 30' generates a signal representative of the output torque. The generated signal may be used for controlling input motor 24. For example, input motor 24 may be shut off if the signal generated by sensor 30 and/or 30' indicates the output torque is approaching an unsafe or unexpected level. Only one stationary sensor 30 or 30' may be provided, or both stationary sensors 30, 30' may be provided.

Figure 1A:
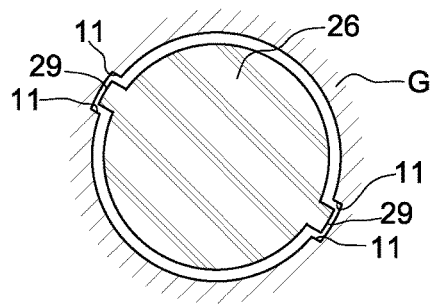
FIG. 1A is a schematic cross-sectional view of a torsionally compliant measurement member of the torque transmission apparatus shown in FIG. 1.

In the embodiment depicted in FIG. 1, measurement member 26 is a torsionally compliant member in the form of a shaft having one end 26A fixed to measurement output element 18 and another end 26B fixed to structural ground G. Thus, measurement member 26 is arranged to undergo torsional deformation caused by torque reaction of measurement output element 18. In the context of the present application, "torsionally compliant" is intended to mean that measurement member is constructed of a non-rigid material, for example an elastomeric material or a soft material that will readily deform under torsional loading. As illustrated in FIG. 1A, radially projecting end stops 29 may be provided on torsionally compliant measurement member 26 for engaging opposing limit surfaces 11 in a housing or other structurally grounded member of apparatus 10 to limit an available range of torsional deformation of measurement member 26 to protect stationary sensor 30 and measurement member 26 from damage due to an overload condition. Alternatively, end stops may be provided on measurement output element 18 to limit the range of angular displacement of the measurement output element 18 for the same purpose of damage prevention.

Stationary sensor 30 in FIG. 1 is arranged to measure torsional deflection of measurement member 26 by directly observing an angular deflection (i.e. an angle of twist) of the measurement member at a location between ends 26A and 26B relative to grounded end 26B. Stationary sensor 30' in FIG. 1 may be arranged at location 31A to measure angular displacement of measurement output element 18 about its rotational axis relative to structural ground, or stationary sensor 30' may be arranged to measure angular deflection of measurement member 26 at location 31B relative to structural ground. The angular displacement or deflection measurements by stationary sensors 30, 30' may be made using an optical encoder, a mechanical encoder, a magnetic encoder, a capacitive encoder, a strain gauge, a piezoelectric element, a rotary variable differential transformer (RVDT), or a similar sensor as the stationary sensor 30, 30'.

Figure 2:
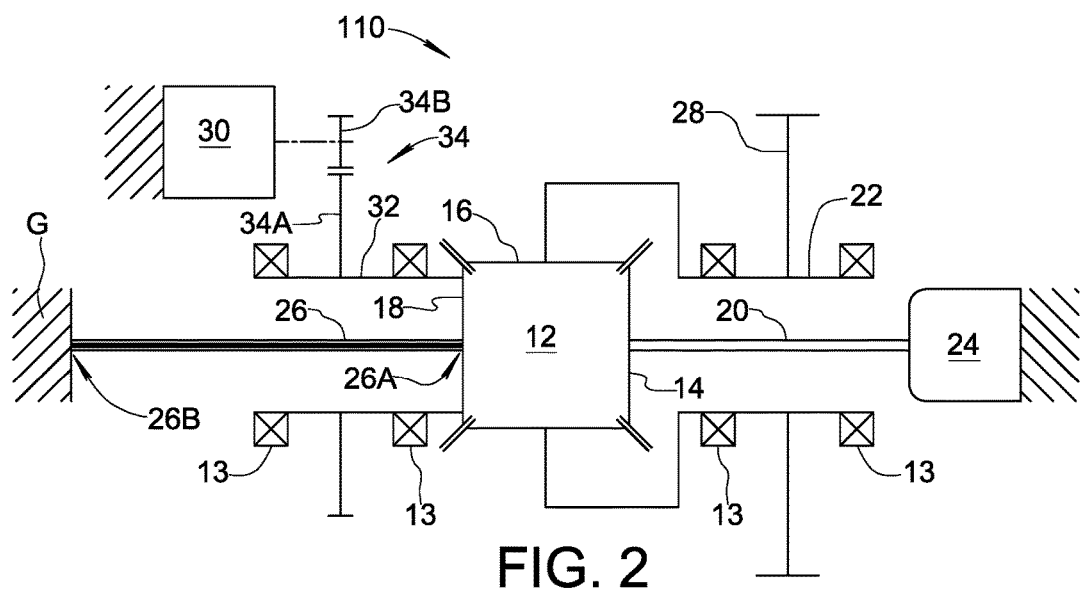
FIG. 2 is a schematic diagram of a torque transmission apparatus incorporating a torque measurement system in accordance with a second embodiment of the present invention.

FIG. 2 illustrates a torque transmission apparatus 110 formed in accordance with a second embodiment of the present invention. Torque transmission apparatus 110 is similar to apparatus 10 of the first embodiment, except that the torsional deflection experienced by measurement member 26 is indirectly measured by stationary torque sensor 30. More specifically, torsional deflection experienced by measurement member 26 is transmitted by a rotatable shaft 32 to a measurement gear train 34 observed by stationary torque sensor 30. Rotatable shaft 32 and measurement gear train 34 are associated with measurement member 26 in that shaft 32, like measurement member 26, is coupled at one end to measurement output element 18 of differential gear system 12, and an input gear 34A of gear train 34 is arranged to rotate with shaft 32. Consequently, input gear 34A experiences the same angular displacement as measurement member end 26A does relative to grounded end 26B. As shown in FIG. 2, measurement gear train 34 includes an output gear 34B driven by first gear 34A. As will be understood, gear train 34 may include further gears (not shown) between input gear 34A and output gear 34B.

The angular displacement experienced by input gear 34A may be amplified by configuring gear train 34 such that output gear 34B undergoes a greater angular displacement in response to a given angular displacement of input gear 34A. For example, in the depicted gear train 34 wherein output gear 34B is directly driven by input gear 34A, output gear 34B may have a diameter that is less than the diameter of input gear 34A.

Stationary torque sensor 30 may be a rotary position encoder, for example a mechanical encoder, an optical encoder, a magnetic encoder, or a capacitive encoder. Stationary torque sensor 30 may detect index markings or poles on output gear 34B itself or on a shaft (not shown) coupled to output gear 34B for rotation therewith. Alternatively, stationary torque sensor 30 may be a resolver or an RVDT in which a shaft coupled for rotation with output gear 34B acts as a rotor element of the resolver or RVDT.

Figure 3:
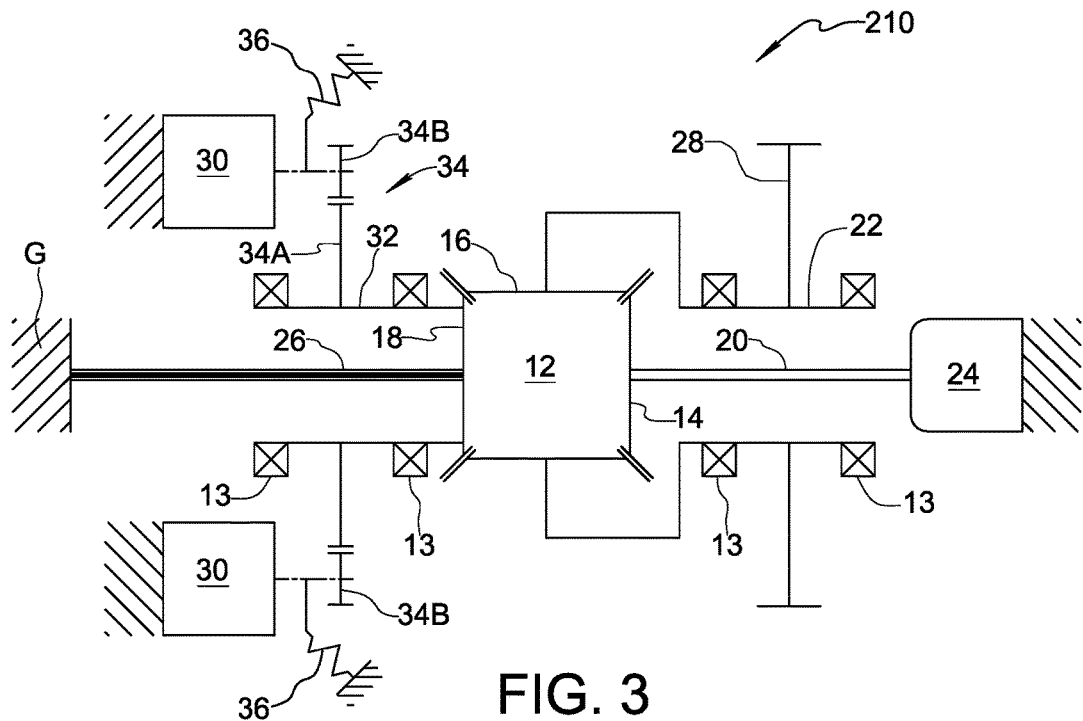
FIG. 3 is a schematic diagram of a torque transmission apparatus incorporating a torque measurement system in accordance with a third embodiment of the present invention.

FIG. 3 shows a torque transmission apparatus 210 formed in accordance with a third embodiment of the present invention. Torque transmission apparatus 210 is similar to apparatus 110 of the second embodiment, however measurement gear train 34 of apparatus 210 includes a pair of diametrically opposite output gears 34B meshed with input gear 34A, a corresponding pair of stationary torque sensors 30, and a pair of springs 36 arranged to preload output gears 34B to remove backlash in measurement gear train 34. By removing backlash, springs 36 lower hysteresis error in the torque measurement. While it is possible to add a backlash removal spring 36 to the measurement gear train 34 shown in FIG. 2, some imbalance would be introduced. Imbalance is prevented by adding a second output gear 34B and spring 36 diametrically opposite the first output gear 34B and spring 36. The use of two stationary torque sensors 30 provides redundancy and an opportunity to cross-check the respective measurement signals against one another. However, only one stationary torque sensor 30 may be provided instead of two.

Figure 4:
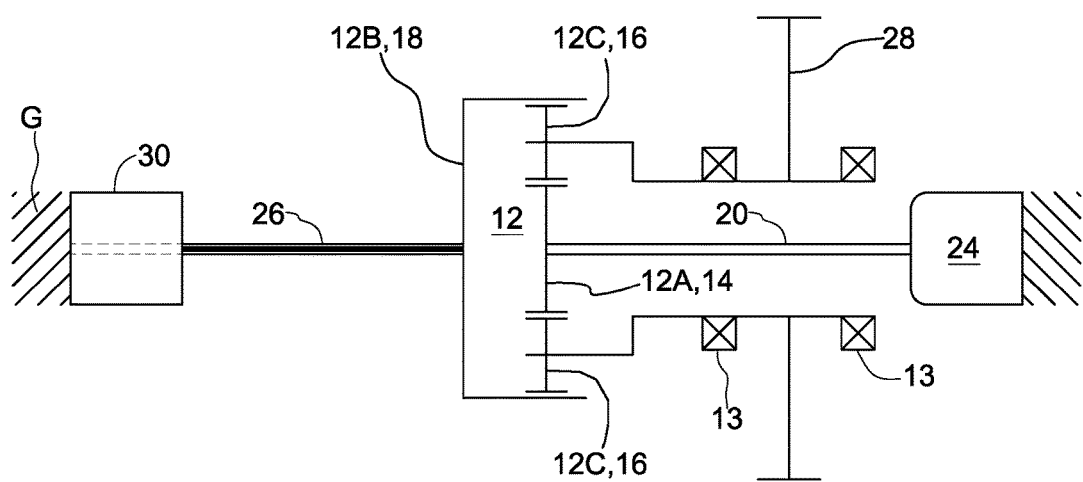
FIG. 4 is a schematic diagram illustrating a variation applicable to any of the embodiments shown in FIGS. 1 through 3.

FIG. 4 illustrates a variation applicable to each of the first through third embodiments depicted in FIGS. 1 through 3. As may be seen, differential gear system 12 may be configured as a planetary differential system having a sun gear 12A, a ring gear 12B surrounding the sun gear, and at least one planet gear 12C meshed with the sun gear and the ring gear. In the illustrated configuration, input element 14 corresponds to sun gear 12A, transmission output element 16 corresponds to the planet gear(s) 12C, and the measurement output element 18 corresponds to ring gear 12B.

Figure 5:
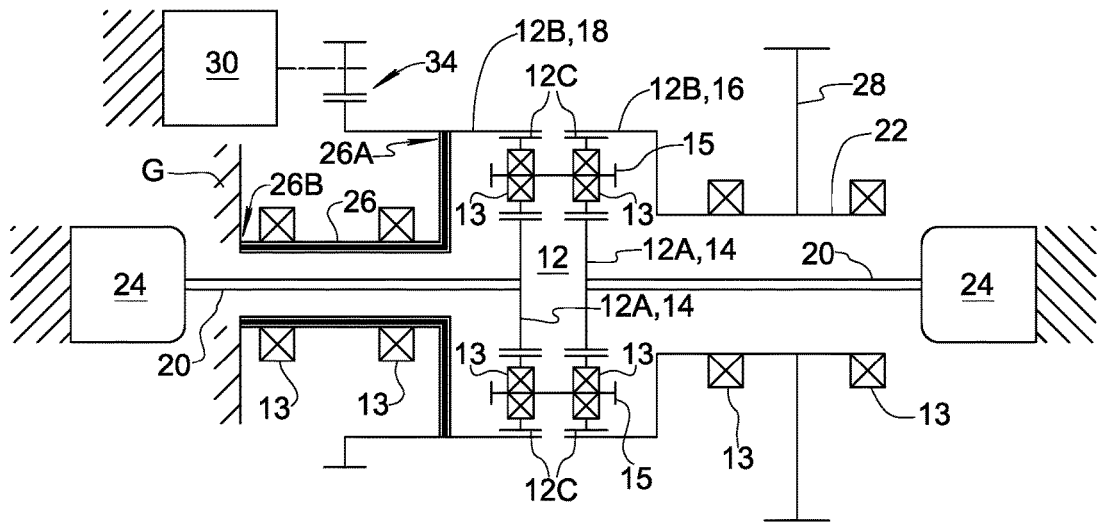
FIG. 5 is a schematic diagram illustrating another variation applicable to any of the embodiments shown in FIGS. 1 through 3.

FIG. 5 illustrates another variation applicable to each of the first through third embodiments. In FIG. 5, differential gear system 12 includes a second input element 14, and the apparatus further comprises a second rotatable input shaft 20 powered by a second input motor 24 and arranged to drive rotation of the second input element 14. Differential gear system 12 may be configured as a planetary gear system having a pair of coaxial sun gears 12A, a pair of coaxial ring gears 12B respectively surrounding the pair of coaxial sun gears, and at least one pair of coaxial planet gears 12C meshed with the pair of sun gears and the pair of ring gears. Each pair of planet gears 12C may be mounted to rotate about a common axle of a carriage 15. As may be understood from FIG. 5, the pair of sun gears 12A correspond to first and second input elements 14, and the pair of ring gears 12B correspond to transmission output element 16 and measurement output element 18, respectively. Measurement member 26 is depicted as being a torsionally compliant shaft. With two input motors 24 provided, the apparatus has greater availability to operate if each input motor has enough power to accomplish the task. The configuration in FIG. 5 provides a dual input system capable of operating with full performance using only one of the input motors 24, and capable of being switched over to the other input motor if the first input motor malfunctions or experiences a failure. The system of FIG. 5 is also capable of being operated with both input motors 24 running simultaneously in either a speed summing arrangement, wherein each input motor 24 is connected to its own respective sun gear 12A, or in a torque summing arrangement (not shown), wherein the two input motors 24 would be connected to a single shared sun gear.

Figure 6:
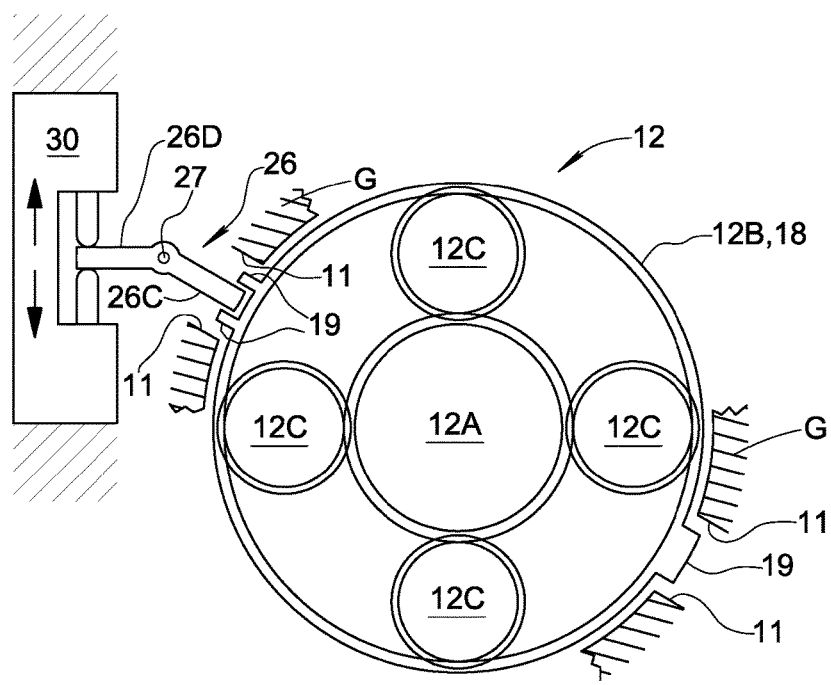
FIG. 6 is a schematic diagram illustrating a further variation applicable to any of the embodiments shown in FIGS. 1 through 3.

FIG. 6 schematically shows a further global variation applicable to all embodiments. As shown in FIG. 6, the torque measurement system may be modified to use a force sensor rather than a rotary position sensor as the stationary sensor 30. By way of non-limiting example, measurement member 26 may include a pivotally-mounted bell crank having a first arm 26C engaged by measurement output element 18 and a second arm 26D arranged to apply force to the stationary sensor 30. Bell crank measurement member 26 pivots about axis 27 in response to rotation of measurement output element 18. Stationary sensor 30 may be a linear force sensor detecting force applied by second arm 26D. While a bell crank link is shown, other types of linkages may be substituted to transmit force from measurement output element 18 to stationary sensor 30. In FIG. 6, stationary sensor 30 is illustrated as a bidirectional linear force senor, however a unidirectional force sensor may be used if it suits the application.

In the variation of FIG. 6, ring gear 12B (acting here as measurement output element 18) includes radially projecting end stops 19 for engaging opposing limit surfaces 11 in a housing or other structurally grounded member of apparatus 10 to limit an available range of angular displacement of ring gear 12B. This feature protects stationary sensor 30 and measurement member 26 from damage in an overload situation.

The present invention offers advantages over prior art systems for measuring output torque. Stationary sensor 30 may be a relatively inexpensive rotary position sensor or force sensor that does not rely on temperature-sensitive strain gauges. The measurement signal generated by stationary sensor 30 does not need to be transmitted across a rotating interface.

While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

What is claimed is:

1. A gearbox system for connection to a motor (24), the gearbox system comprising:
    a structural ground (G) to which the motor (24) is fixedly attached;
    a differential gear system (12) including an input element (14), a transmission output element (16), and a measurement output element (18), wherein the transmission output element (16) rotates in response to rotation of the input element (14) and the measurement output element (18) reacts an output torque transmitted by the transmission output element (16) by providing a reaction torque equal and opposite to the output torque;
    a rotatable input shaft (20) driven to rotate by the motor (24) and connected to the input element (14), wherein the input element (14) rotates in response to rotation of the input shaft (20);
    a rotatable output shaft (22) driven to rotate by rotation of the transmission output element (16), wherein the rotatable output shaft (22) transmits the output torque;
    a measurement member (26) connected to and arranged between the measurement output element (18) and the structural ground (G); and
    a stationary sensor (30, 30') associated with the measurement member (26) or the measurement output element (18) for measuring at least one of (i) a deformation of the measurement member (26), (ii) an angular displacement of the measurement output element (18), (iii) a force applied by the measurement member (26), and (iv) a force applied by the measurement output element (18), the measurement by the stationary sensor (30, 30') being proportional to the output torque, wherein the stationary sensor (30, 30') generates a signal representative of the output torque.

2. The gearbox system according to claim 1, wherein the measurement member (26) is a torsionally compliant member arranged to undergo torsional deformation due to angular displacement of the measurement output element (18).

3. The gearbox system according to claim 2, wherein the stationary sensor (30, 30') measures the torsional deformation of the measurement member (26).

4. The gearbox system according to claim 2, wherein the stationary sensor (30, 30') measures the angular displacement of the measurement output element (18).

5. The gearbox system according to claim 4, further comprising a measurement gear train (34) associated with the measurement output element (18), wherein the measurement gear train includes an output gear (34B) driven to rotate through an angular displacement proportional to the angular displacement of the measurement output element (18), wherein the stationary sensor (30) is arranged to detect the angular displacement of the output gear (34B).

6. The gearbox system according to claim 5, wherein the stationary sensor (30) includes a rotary position encoder.

7. The gearbox system according to claim 5, wherein the stationary sensor (30) includes a resolver.

8. The gearbox system according to claim 5, wherein the measurement gear train (34) amplifies the angular displacement of the measurement output element (18).

9. The gearbox system according to claim 5, wherein the measurement gear train (34) includes at least one spring (36) arranged to remove backlash in the measurement gear train (34).

10. The gearbox system according to claim 5, wherein the measurement gear train (34) includes a pair of output gears (34B) arranged opposite one another to remove backlash in the measurement gear train (34).

11. The gearbox system according to claim 2, wherein the measurement member (26) includes at least one radially projecting end stop for engaging a pair of limit surfaces (11) associated with structural ground (G) for limiting a range of torsional deformation of the measurement member (26).

12. The gearbox system according to claim 1, wherein the measurement member (26) is a rigid member arranged to transmit torque from the measurement output element (18).

13. The gearbox system according to claim 12, wherein the stationary sensor (30, 30') includes a force sensor arranged to detect force applied to the stationary sensor (30, 30') by the measurement member (26).

14. The gearbox system according to claim 13, wherein the measurement member (26) includes a pivotally-mounted bell crank (26) having a first arm (26C) engaged by the measurement output element (18) and a second arm (26D) arranged to apply force to the stationary sensor (30, 30').

15. The gearbox system according to claim 1, wherein the differential gear system (12) includes a planetary gear system having a sun gear (12A), a ring gear (12B) surrounding the sun gear (12A), and at least one planet gear (12C) meshed with the sun gear (12A) and the ring gear (12B).

16. The gearbox system according to claim 15, wherein the input element (14) includes the sun gear (12A), the transmission output element (16) includes the at least one planet gear (12C), and the measurement output element (18) includes the ring gear (12B).

17. The gearbox system according to claim 1, wherein the gearbox system is adapted for connection to a second motor (24), wherein the differential gear system (12) further includes a second input element (14), and the gearbox system further comprises a second rotatable input shaft (20) driven to rotate by the second motor (24) and connected to the second input element (14) to drive rotation of the second input element.

18. The gearbox system according to claim 17, wherein the differential gear system (12) includes a planetary gear system having a pair of coaxial sun gears (12A), a pair of coaxial ring gears (12B) respectively surrounding the pair of coaxial sun gears (12A), and at least one planet gear (12C) meshed with the pair of sun gears (12A) and the pair of ring gears (12B), wherein the input element (14) and the second input element (14) include the pair of sun gears (12A), and the transmission output element (16) and the measurement output element (18) include the pair of ring gears (12B).

19. The gearbox system according to claim 18, wherein the transmission output element (16) indirectly engages the measurement output element (18) by way of the at least one planet gear (12C).

20. The gearbox system according to claim 1, wherein the measurement output element (18) includes at least one radially projecting end stop for engaging a pair of limit surfaces (11) associated with structural ground (G) for limiting a range of angular displacement of the measurement output element (18).

21. The gearbox system according to claim 1, wherein the transmission output element (16) directly engages the measurement output element (18).

22. A gearbox for connection to a motor (24) by way of a rotatable input shaft (20) driven to rotate by the motor (24), the gearbox comprising:
a structural ground (G) to which the motor (24) is fixedly attached;
a differential gear system (12) including an input element (14) which rotates in response to rotation of the input shaft (20), a transmission output element (16), and a measurement output element (18), wherein the transmission output element (16) rotates in response to rotation of the input element (14) and the measurement output element (18) reacts an output torque transmitted by the transmission output element (16) by providing a reaction torque equal and opposite to the output torque;
a measurement member (26) connected to and arranged between the measurement output element (18) and the structural ground (G); and
a stationary sensor (30, 30') associated with the measurement member (26) or the measurement output element (18) for measuring at least one of (i) a deformation of the measurement member (26), (ii) an angular displacement of the measurement output element (18), (iii) a force applied by the measurement member (26), and (iv) a force applied by the measurement output element (18), the measurement by the stationary sensor (30, 30') being proportional to the output torque, wherein the stationary sensor (30, 30') generates a signal representative of the output torque.

* * * * *